(12) United States Patent
Kilper et al.

(10) Patent No.: US 10,887,007 B2
(45) Date of Patent: Jan. 5, 2021

(54) FAST EDFA GAIN SPECTRUM CHARACTERIZATION USING WEAK PROBE AND FOURIER SAMPLING

(71) Applicant: ARIZONA BOARD OF REGENTS ON BEHALF OF THE UNIVERSITY OF ARIZONA, Tucson, AZ (US)

(72) Inventors: Daniel Kilper, Tucson, AZ (US); Weiyang Mo, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 16/487,981

(22) PCT Filed: Feb. 22, 2018

(86) PCT No.: PCT/US2018/019206
§ 371 (c)(1),
(2) Date: Aug. 22, 2019

(87) PCT Pub. No.: WO2018/156752
PCT Pub. Date: Aug. 30, 2018

(65) Prior Publication Data
US 2020/0028584 A1 Jan. 23, 2020

Related U.S. Application Data

(60) Provisional application No. 62/462,236, filed on Feb. 22, 2017.

(51) Int. Cl.
*H04J 14/02* (2006.01)
*H04B 10/077* (2013.01)
(Continued)

(52) U.S. Cl.
CPC ... *H04B 10/0775* (2013.01); *H04B 10/07955* (2013.01); *H04B 10/503* (2013.01); *H04J 14/02* (2013.01)

(58) Field of Classification Search
CPC .......... H04B 10/0775; H04B 10/07955; H04B 10/503; H04J 14/02
See application file for complete search history.

(56) References Cited

U.S. PATENT DOCUMENTS

| 2002/0054726 | A1  | 5/2002 | Fondeur |
| 2003/0053195 | A1* | 3/2003 | Chen ...................... H01S 3/302 359/337.1 |

(Continued)

*Primary Examiner* — Dzung D Tran
(74) *Attorney, Agent, or Firm* — Stuart H. Mayer; Mayer & Williams PC (57) ABSTRACT

A method is provided for determining the gain spectrum of an optical amplifier such as an erbium doped optical amplifier (EDFA). In accordance with the method, an optical amplifier such as an EDFA that is to accommodate a specified number of channels at different optical wavelengths is provided. A subset of the specified number of channels at which gain is to be measured is selected. The number of channels in the subset is determined based at least in part on a number of samples required by the Nyquist sampling theorem to reconstruct the gain spectrum. A gain value for each channel in the selected subset of channels is measured for a probe signal that does not perturb the gain spectrum of the EDFA by more than a prescribed amount. The gain spectrum for the EDFA is constructed from the measured gain values.

32 Claims, 9 Drawing Sheets

(51) Int. Cl.
*H04B 10/079* (2013.01)
*H04B 10/50* (2013.01)

(56) References Cited

U.S. PATENT DOCUMENTS

| | | | |
|---|---|---|---|
| 2005/0168247 A1* | 8/2005 | Halvorson | G01J 11/00 |
| | | | 327/91 |
| 2008/0085115 A1* | 4/2008 | Turukhin | H04J 14/02 |
| | | | 398/34 |
| 2011/0123192 A1* | 5/2011 | Rosenthal | H03M 1/121 |
| | | | 398/43 |
| 2015/0304036 A1 | 10/2015 | Huang et al. | |
| 2016/0211939 A1* | 7/2016 | Yu | H04L 27/34 |
| 2018/0287697 A1* | 10/2018 | Kilper | H04B 10/0775 |

\* cited by examiner

FAST EDFA GAIN SPECTRUM CHARACTERIZATION USING WEAK PROBE AND FOURIER SAMPLING

CROSS REFERENCE TO RELATED APPLICATION

This application claims the benefit of U.S. Provisional Application Ser. No. 62/462,236, filed 22 Feb. 2017, entitled "FAST EDFA GAIN SPECTRUM CHARACTERIZATION USING WEAK PROBE AND FOURIER SAMPLING", the contents of which are incorporated herein by reference.

GOVERNMENT FUNDING

This invention was made with government support under Grant No. EEC0812072 and 1601784, awarded by NSF. The government has certain rights in the invention.

BACKGROUND

Knowledge of the gain spectrum (i.e. gain ripple and tilt) of erbium-doped fiber amplifiers (EDFAs) is important for a variety of reasons. For instance, dynamic effects such as power excursions that arise when channels in WDM transmission networks are added, dropped or switched to different wavelengths can be determined from the gain spectrum. That is, a change in the input wavelength configuration can affect the gain of individual channels and generate power excursions. Knowing in advance the EDFA gain spectra of the optical amplifiers in a network can help to properly provision new channels with minimal impact to the network performance, or with an impact that is significantly reduced in time because the tuning time is proportional to the power excursion. As dynamic networks with frequent wavelength switching become more commonplace to accommodate the rapidly increasing demands for data transmission, it has become even more important to be able to determine the gain spectrum of the EDFAs that are being used as quickly as possible.

Unfortunately, the gain spectrum of any particular EDFA is not deterministic and not only depends on its fiber structure and length, but also on the input wavelengths and powers. Moreover, while the gain spectrum for even a single stage EDFA can depend on the interplay of a number of factors, in practice more complex EDFAs are often employed. Such EDFAs may have two or more stages and incorporate wavelength-dependent elements such as embedded gain flattening filters (GFFs), variable optical attenuators (VOAs), and tunable mid-stage VOAs. Also, tilt-controlled EDFAs are generally deployed for cancelling out the Stimulated Raman Scattering (SRS) effect which happens as the signal propagates in the fiber. The amount of EDFA tilt is usually set to a negative value that compensates for SRS in the following fiber span. The net gain spectrum of a multi-stage EDFA is the sum of the gain spectra of the individual stages, which are typically controlled by an AGC feed-back loop that keeps the net tilt and total power gain constant.

As a consequence of the non-deterministic nature of the EDFA gain spectrum, estimating the gain spectrum is difficult and typically requires measuring the gain of each or most of the channels that the EDFA is to accommodate. In a typical WDM system having 96 or more channels, for instance, this requires applying an input signal at each of the 96 wavelengths that correspond to each channel and measuring the output power to determine the gain.

Prior work has estimated the EDFA gain spectrum based on measurements of a single channel and WDM gain information. An accuracy of 0.5 dB in estimating power excursions due to channel reconfiguration was experimentally verified with four channels added into 12 surviving channels. However, it has been found that this model could result in higher errors when only a few channels are lit in the network, particularly when the EDFA tilt is used to compensate for the SRS effect.

Figure 1:
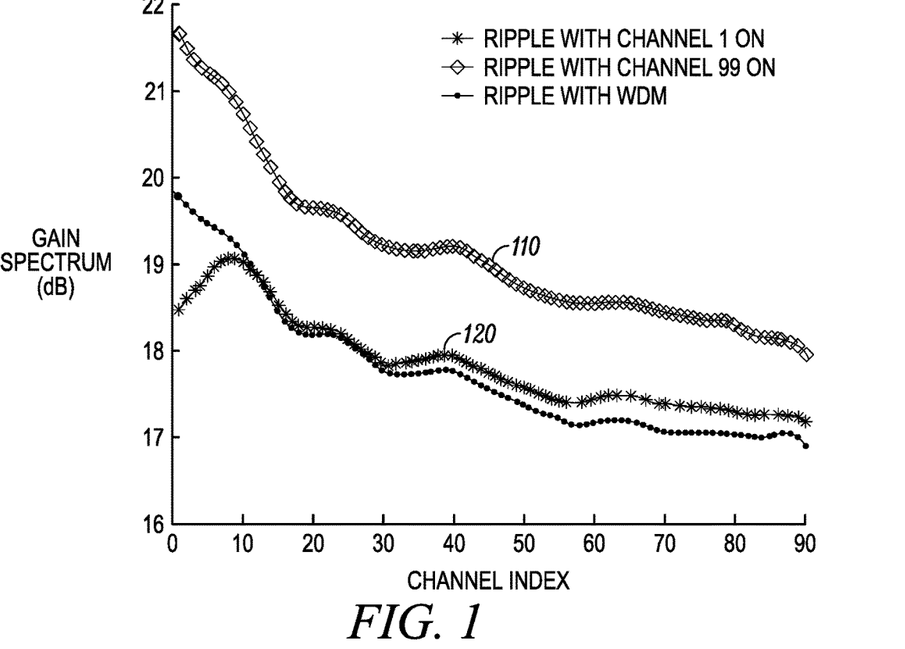
FIG. 1 shows the gain spectrum measurements of a single erbium doped fiber amplifier (EDFA) operating at −3 dB tilt and 18 dB gain.

FIG. 1 shows the gain spectrum measurements of a single EDFA operating at −3 dB tilt and 18 dB gain. First, the gain spectrum is measured with a WDM input at −18 dBm/channel, and its tilt is 2.7 dB as determined from linear regression. Then two extreme cases are measured to demonstrate that the actual gain spectrum is non-deterministic from the WDM ripple. The curve 110 shows the gain spectrum with only the leftmost channel (channel 1) provisioned. The curve 120, on the other hand, shows the gain spectrum when only the rightmost channel (channel 90) is provisioned. The reason the gain changes so dramatically is that a higher average pump/channel tends to result in a more negative tilt, and the tilt grows much faster on the short wavelengths. The EDFA gain is smaller at the long wavelengths and therefore more pump power is needed to achieve the same gain when channels are provisioned at the long wavelengths (i.e., higher channel numbers). Thus, if this curve were used to estimate the power excursions on the short wavelength regime the results would be quite inaccurate.

Figure 2:
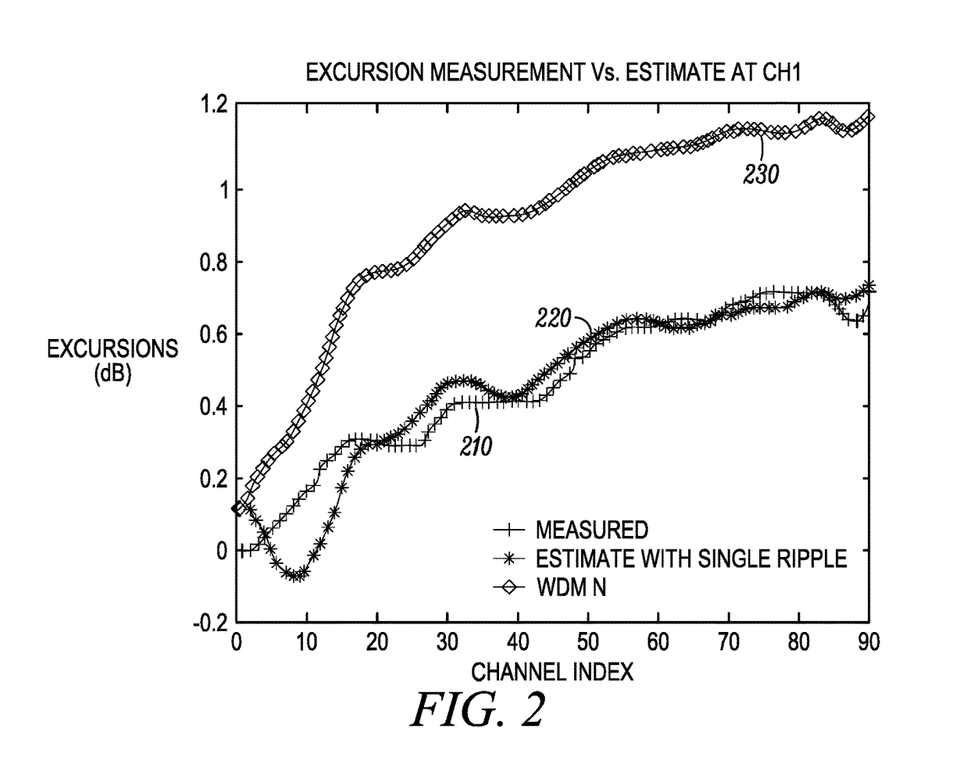
FIG. 2 shows the measured power excursion for channel 1 and an estimate of the excursion when channels at other wavelengths are added to the EDFA of FIG. 1.

FIG. 2 shows the measured excursion for channel 1 and an estimate of the excursion when channels at other wavelengths are added. The curve 210 is the actual excursion on channel 1 that is measured when channel 1 is added. The curve 220 estimates the excursion that will arise by adding channel 1 based on measurements of the gain spectrum. The curve 230 is the excursion estimate that is obtained using WDM fit theory and the black WDM curve from FIG. 1. As the curves illustrate, the excursion estimate is in good agreement with the measurements when using the actual measured gain spectrum rather than the WDM-based estimate. There is still 0.2 dB offset in the low wavelength region, however, which is likely due to spectral hole burning (SHB), which is common at those wavelengths.

Accordingly, it would be desirable to provide an accurate, faster and easier method for determining the gain spectrum of an EDFA.

SUMMARY

In accordance with one aspect of the subject matter disclosed herein, a method and apparatus is provided for determining the gain spectrum of an optical amplifier such as an erbium doped optical amplifier (EDFA). In accordance with the method, an optical amplifier such as an EDFA that is to accommodate a specified number of channels at different optical wavelengths is provided. A subset of the specified number of channels at which gain is to be measured is selected. The number of channels in the subset is determined based at least in part on a number of samples required by the Nyquist sampling theorem to reconstruct the gain spectrum. A gain value for each channel in the selected subset of channels is measured for a probe signal that does not perturb the gain spectrum of the EDFA by more than a prescribed amount. The gain spectrum for the EDFA is constructed from the measured gain values.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

As previously mentioned, power excursions can be predicted from the EDFA gain spectrum. However, when a new channel is added to a system in which a number of channels are already lit, the power excursion for that channel not only depends on the channel's ripple (i.e. its gain offset about a target gain), but also on its input power. By probing the channel with a relatively low power signal compared to the lit channels, the impact on the power excursion will be minimal and hence can be neglected. That is, a sufficiently low power signal that does not affect the gain spectrum of the EDFA can be used as an input probe to the EDFA. By measuring the output power of the weak probe, its gain can be calculated, thereby providing one of the data points needed to determine the EDFA gain spectrum.

By using a weak probe at every channel that is to be allocated to the EDFA, the complete EDFA gain spectrum can be obtained. One disadvantage of this approach is the amount of time needed to sample all the channels, even if a tunable laser is used to scan them. As previously mentioned, this can be particularly problematic when channels in WDM transmission systems are being newly provisioned or reconfigured and the knowledge of the gain spectrum is needed in advance. As explained below, EDFAs have been found to exhibit characteristics that allow the gain spectrum to be obtained much more quickly.

Figure 3A:
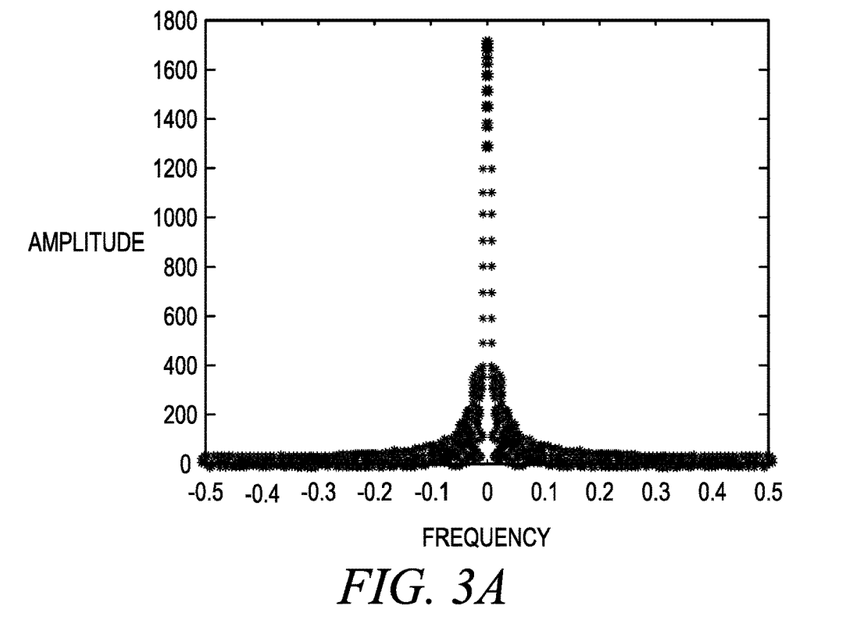
FIG. 3(a) shows the frequency response of a single stage EDFA that is obtained by taking the Fourier transform of an EDFA gain spectrum.

FIG. 3(a) shows the frequency response of a single stage EDFA that is obtained by taking the Fourier transform of an EDFA gain spectrum. Likewise, FIG. 3(c) shows the frequency response of a tilt-controlled, two stage EDFA. As shown, most of the frequency content of the EDFA gain spectrum lies within about 0.05 Hz. This result is perhaps surprising given the relative complexity of the typical EDFA gain spectrum and its complex dependency on various factors, including the wavelength-dependent components that are often incorporated in EDFAs.

Since the spectral content of the EDFA gain spectrum is largely located at low frequencies, according to the Nyquist sampling theorem a good estimate of the gain spectrum can be made even with just a few measurements across the entire spectral band and using resampling to reconstruct the full gain characteristics with minimal errors.

Figure 3B:
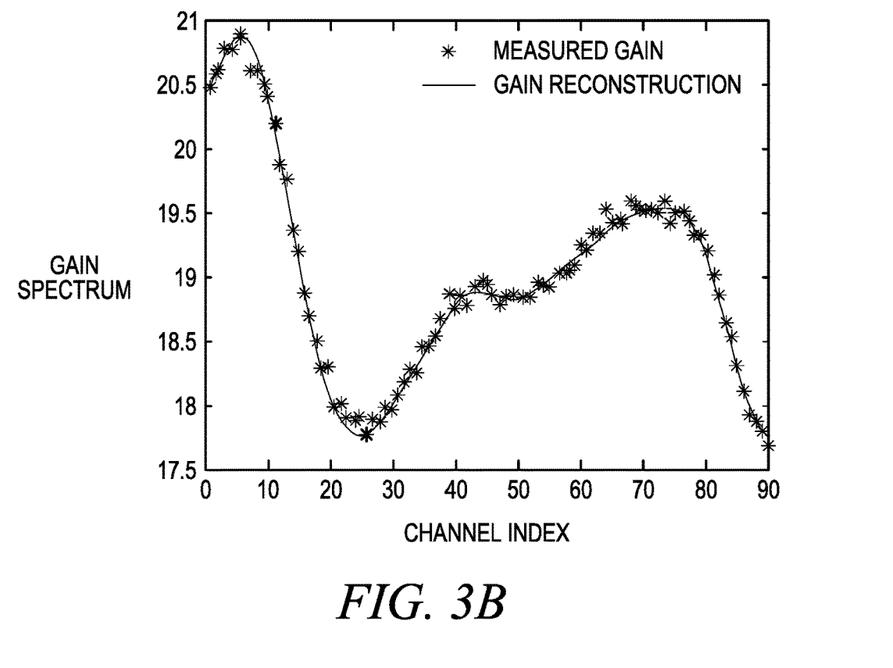
FIG. 3(b) shows the gain spectrum for the EDFA of FIG. 3(a) when it is reconstructed using a 0.1 Hz sampling rate.
Figure 3C:
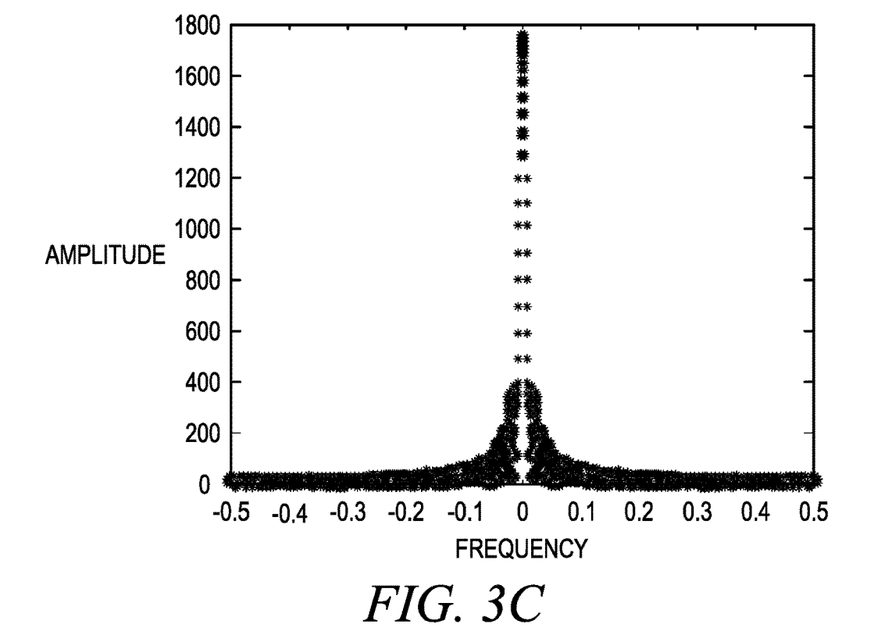
FIG. 3(c) shows the frequency response of a tilt-controlled, two stage EDFA.
Figure 3D:
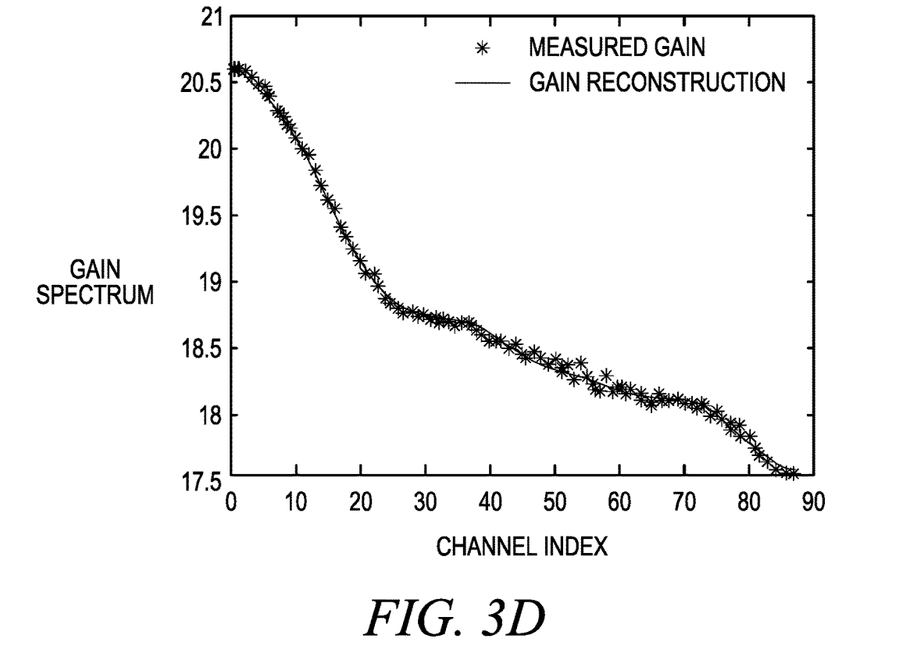
FIG. 3(d) shows the gain spectrum for the EDFA of FIG. 3(c) when it is reconstructed using a 0.1 Hz sampling rate.

In FIG. 3(b), the solid curve shows the gain spectrum for the EDFA of FIG. 3(a) when it is reconstructed using a 0.1 Hz sampling rate (i.e. using a 10% sample of the WDM channels). As shown, the curve perfectly fits the actual gain measurements, with only two channels (channels 7 and 8) having a 0.15 dB offset, which might be due to spectral hole burning (SHB), which varies at high frequency. Thus, this technique may even be used to identify those wavelengths that are affected by SHB. In FIG. 3(d) the solid curve shows the gain spectrum for the EDFA of FIG. 3(c) when it is reconstructed using a 0.1 Hz sampling rate. As shown, the error of the composite gain after the second stage is less than 0.1 dB. The composite gain reconstruction performs better than the reconstruction for the single stage EDFA because the EDFA is tilt-controlled since it tries to maintain a linear composite gain characteristic, which reduces the required sampling frequency for the reconstruction of the gain characteristics.

However, as previously discussed, due to the low frequency content of the EDFA gain spectrum, only a few channels need to be sampled to obtain the complete gain spectrum with a very low error. On the other hand, the use of a weak probe to obtain the gain spectrum is only necessary when only relatively few channels are lit. When the number of channels over a lightpath is more than some minimum number, the power excursion can be estimated using a WDM gravity fit technique, which has been found to give a good agreement with actual measurements. Accordingly, in practice, the weak probe only needs to be used when a WDM gravity fit is not sufficiently accurate.

Figure 4:
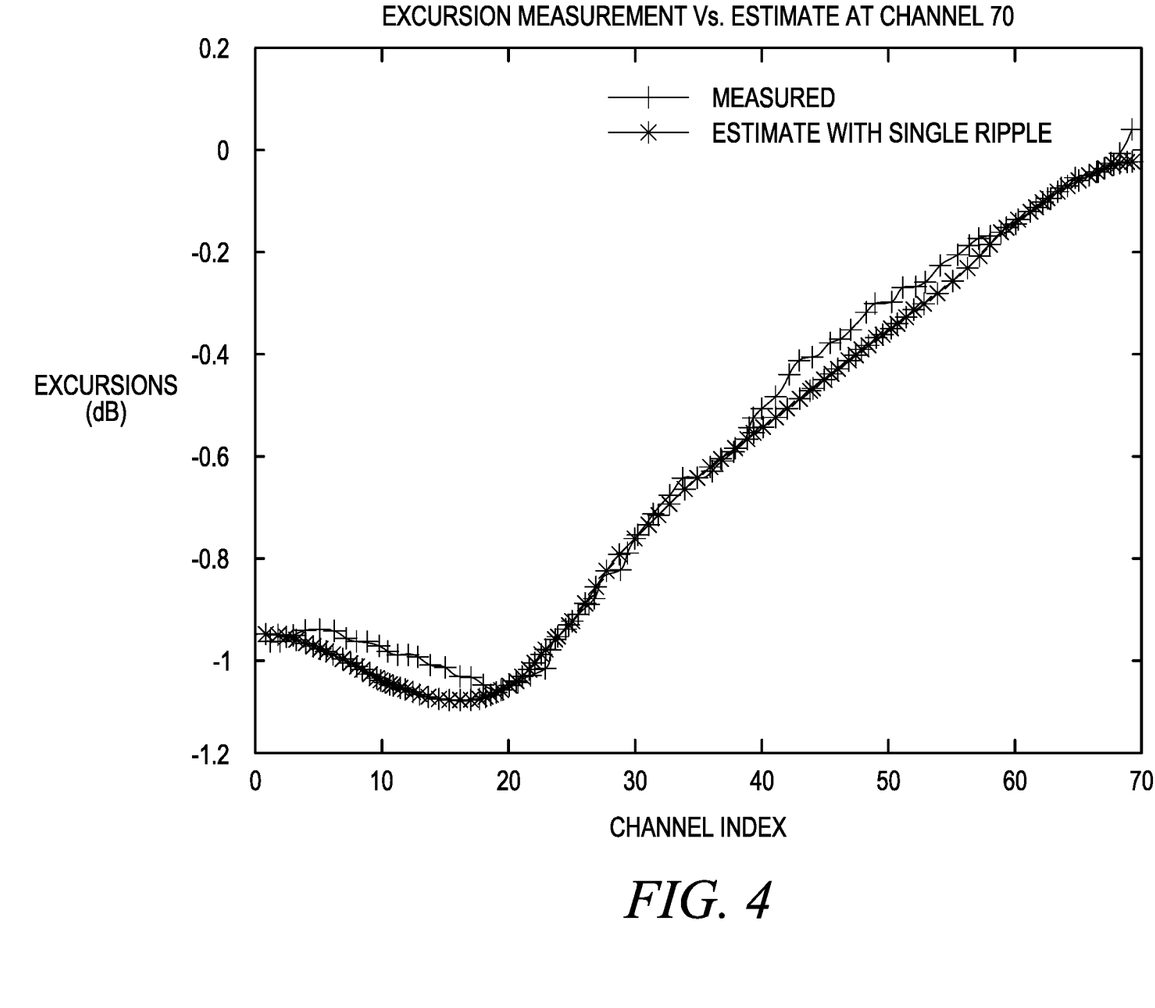
FIG. 4 shows the measured gain excursion (starred curve) and estimated gain excursion (cross-barred curve) of an EDFA when channel 70 is lit and channels are continuously added from channel 69 to channel 5.

The starred (*) curve in FIG. 4 shows the measured gain excursion when channel 70 is lit and channels are continuously added from channel 69 to channel 5. The curve overlaid with cross-bars in FIG. 4 is estimated using the weak probe technique discussed above to estimate the first 2 channels (channels 69 and 68) and then using a WDM fit to estimate the remaining (channels 67-5). The weak probe was used to measure every 10 wavelengths and the results resampled to 70 wavelengths.

Figure 5A:
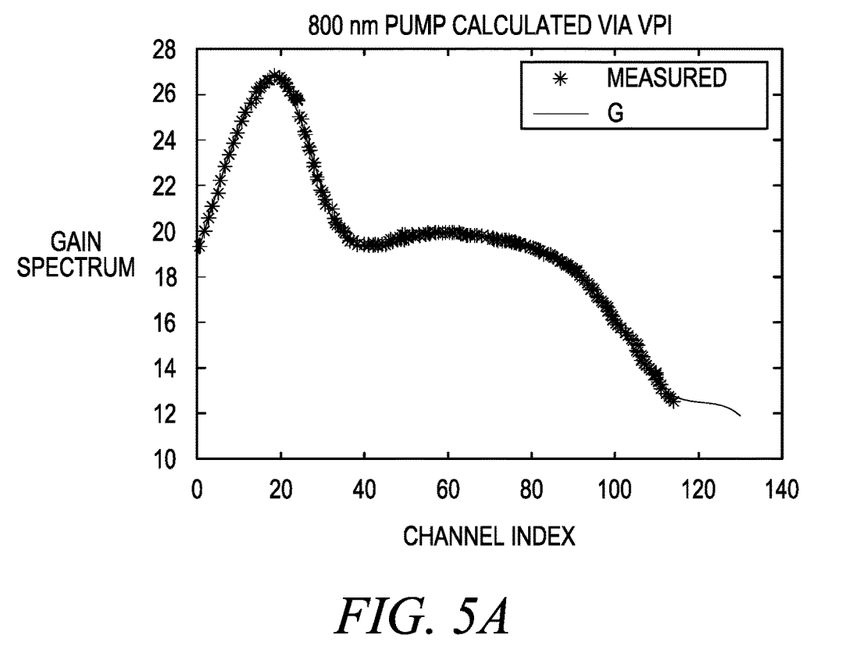
FIGS. 5(a) and 5(b) show the gain spectra for a single stage EFDA pumped at 980 nm and 1480 nm, respectively, as determined by measuring the gain using a weak probe at every channel (starred data points) and using a sampled set of gain measurements taken at a sample rate of 4 nm (solid curve)
Figure 5B:
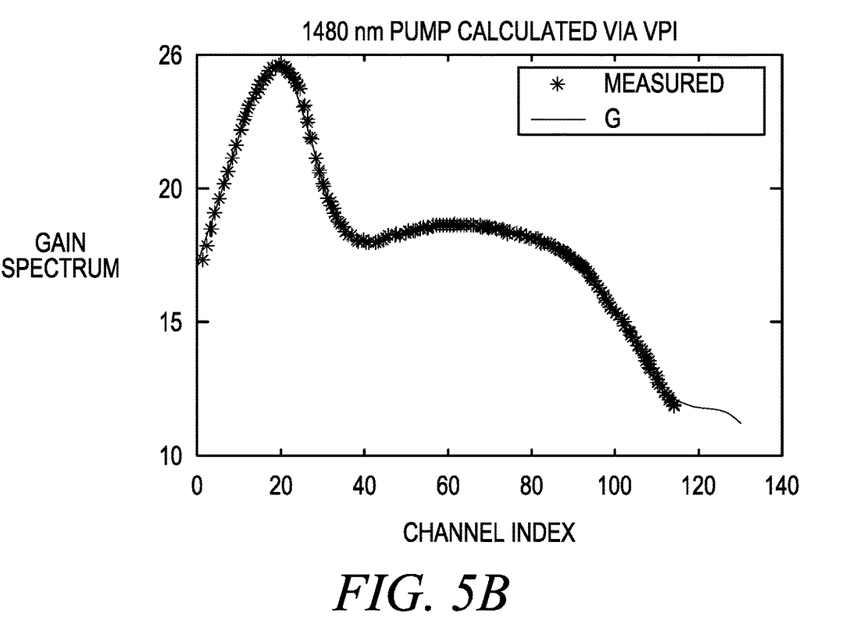
Figure 5C:
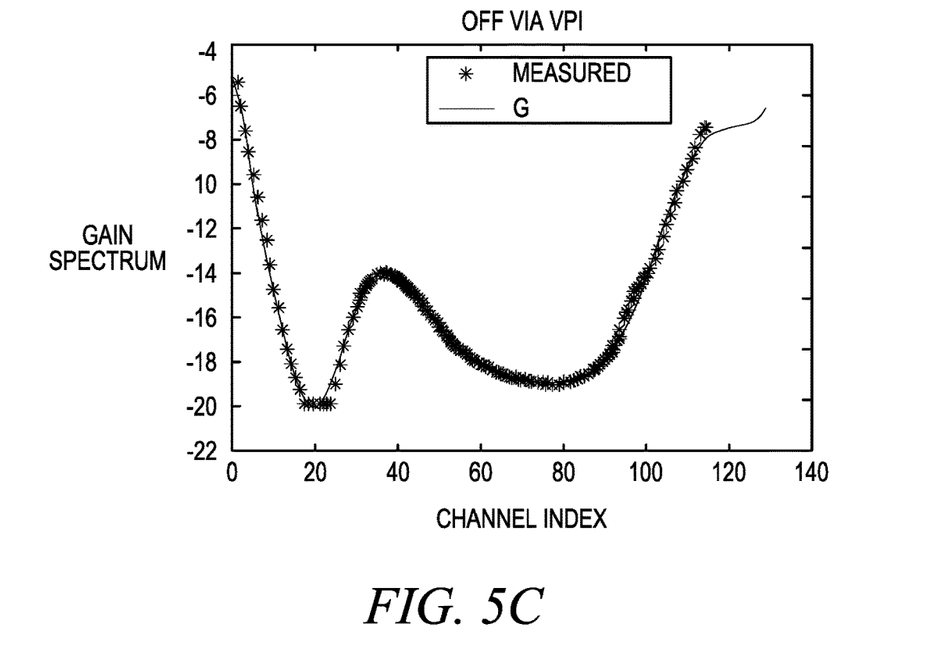
FIGS. 5(c) and 5(d) show the gain spectra at two different gain levels for a two stage EFDA having a gain flattening filter as determined by measuring the gain using a weak probe at every channel (starred data points) and using a sampled set of measurements taken at a sample rate of 4 nm (solid curve).
Figure 5D:
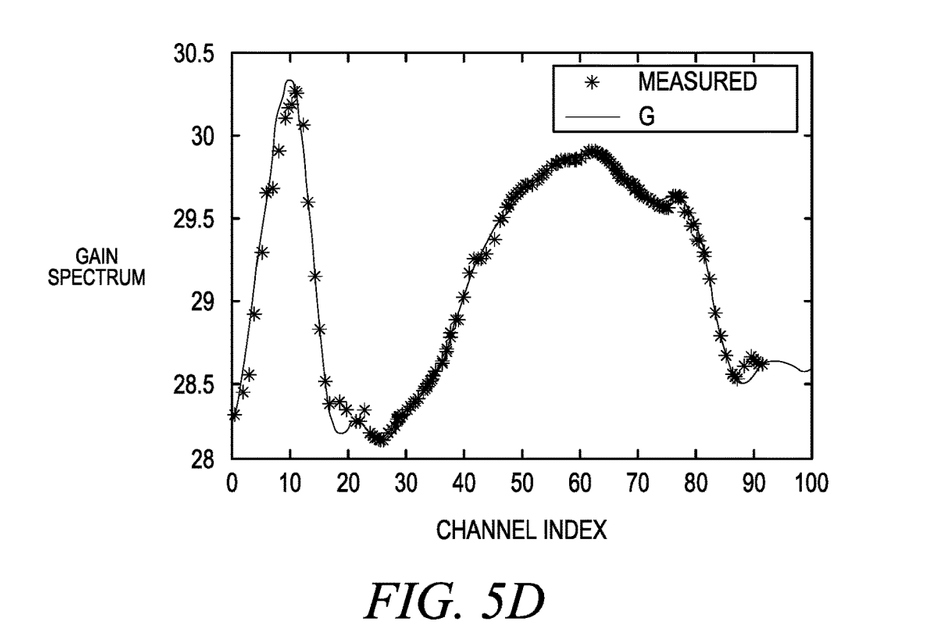

FIGS. 5(a) and 5(b) show the gain spectra for a single stage EFDA pumped at 980 nm and 1480 nm, respectively, as determined by measuring the gain using a weak probe at every channel (starred data points) and using a sampled set of gain measurements taken at a sample rate of 4 nm (solid curve). Likewise, FIGS. 5(c) and 5(d) show the gain spectra at two different gain levels for a two stage EFDA having a gain flattening filter as determined by measuring the gain using a weak probe at every channel (starred data points) and using a sampled set of measurements taken at a sample rate of 4 nm (solid curve). The gain flattening filter in FIG. 5(c) has been optimized iteratively until it achieved a uniform output channel distribution at G=20 dB. FIG. 5(d) shows the EDFA gain spectrum when G=29 dB. The accuracy is found to be within 0.2 dB using a 4 nm sampling rate.

As previously mentioned, the probe that is used to sample the gain spectrum should be sufficiently low in power so that it does not affect the gain spectrum of the EDFA. This power level will vary from amplifier to amplifier and its maximum value can be determined empirically for each amplifier by increasing the power of the probe until the gain spectrum is impacted. Moreover, the probe power that is used will also depend on how large a perturbation to the EDFA and the overall system can be tolerated. For instance, a 0.1-0.2 dB fluctuation may be tolerable in some cases. As a general matter, in some embodiments the probe may be at least 10 dB or more down in power relative to the channels that are deployed in the system.

In one alternative embodiment, instead of using a weak probe to sample the gain spectrum, a probe pulse having a duration much shorter than the response time of the optical amplifier whose gain spectrum is being determined may be used. If a probe pulse having such a short duration is used, the amplifier will be unable to follow the instantaneous changes in the loading conditions and no power excursions occur. Therefore, a short duration pulse can probe the amplifier gain characteristics without causing power dynamics or transient effects. In the case of an EDFA, for example, automatic gain control (AGC) mechanisms generally have a response time on the order of hundreds of microseconds and thus the probe pulse should have a duration less than this value.

In some embodiments the probe may be generated by a tunable laser that scans through the channels that are to be sampled. The tunable laser may be continuous, or it may be pulsed at each channel with a pulse duration which, as noted above, may be determined by the response time of the EDFA. In other embodiments the probe may be generated by a broadband light source that is filtered into multiple bands of optical power at the different spectral locations that are to be sampled.

Figure 6:
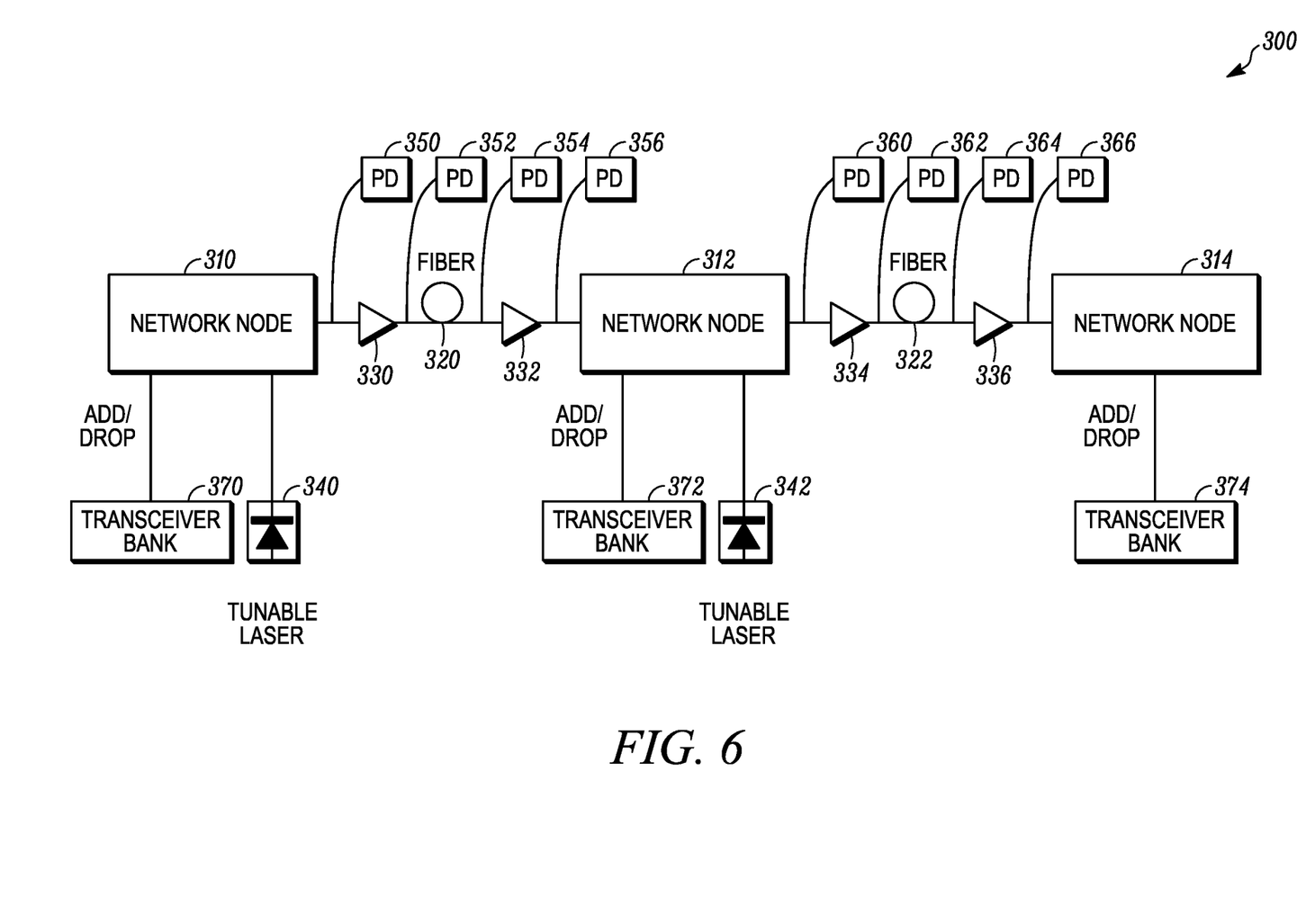
FIG. 6 shows one example of a WDM transmission network that may incorporate the methods, techniques and systems described herein.

FIG. 6 shows one example of a WDM transmission network 300 that may incorporate the methods, techniques and systems described herein. WDM transmission network 300 includes network nodes 310, 312 and 314. Each network node is connected to at least one other network node by optical links 320 and 322, which may comprise optical fibers through which the WDM signals propagate. For example, network node 310 is connected to network node 312 by link 320, and network node 312 is connected to network node 314 by link 322. The links may each comprise at least two optical fibers that carry optical signals traveling in opposite directions to provide bidirectional communication. Capacity in any link can be increased by increasing the number of fiber pairs that are provided. Each link may include one or more optical amplifiers for amplifying the WDM signals. For example, link 320 includes optical amplifiers 330 and 332 and link 322 includes optical amplifiers 334 and 336. While links 320 and 322 are illustratively shown as having the same number of optical amplifiers, more generally each link may have any suitable number of optical amplifier, which may or may not be the same number of nodes as in any other link in the network. Information is transmitted and received over WDM transmission network 200 by the modulation of one or more optical wavelengths to encode data onto the wavelengths. The various modulated optical wavelengths are combined into a single WDM signal that is transmitted over transmission links by optical sources (e.g., lasers) and modulators located in transceiver banks 370, 372 and 374 associated with the network nodes 310, 312 and 314, respectively. The transceiver banks 370, 372 and 374 also include receivers for the receiving optical wavelengths dropped at each of the network nodes.

WDM transmission network 300 may comprise a point-to-point optical network with terminal nodes, a ring optical network, a mesh optical network, or any other suitable optical network or a combination of optical networks. The number of nodes and optical links shown in FIG. 6 is exemplary and provided for simplicity of illustration. The network nodes 310, 312 and 314, which may employ fixed or reconfigurable optical add/drop multiplexing (ROADM) nodes, may be in some implementations colorless and/or directionless.

Figure 7:
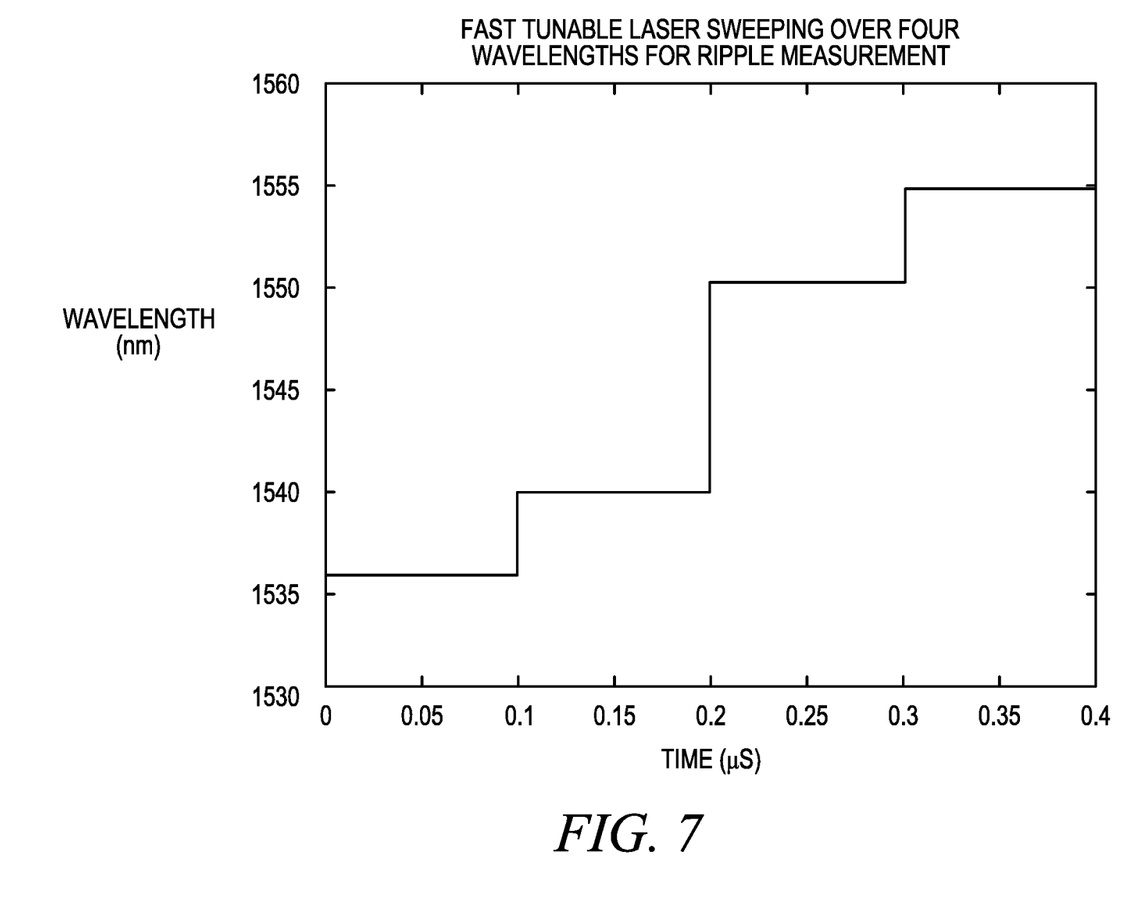
FIG. 7 shows one example of a probe from a tunable laser that sweeps over four wavelengths.

As further shown in FIG. 6, the gain of each optical amplifier may be sampled by injecting a weak probe into the spans using tunable lasers 340 and 342 respectively located at the network nodes 310 and 312. The tunable laser scans across the wavelengths at which the gain is to be sampled. Photodetectors (e.g., photodiodes) or other optical channel monitoring devices are used to tap a portion of the input powers to the optical amplifiers and the output powers from the optical amplifiers in order to determine the gain at the sampled wavelengths. For instance, in the example of FIG. 6, for link 320 photodiodes 350 and 352 tap a portion of the input and output powers, respectively, from optical amplifier 330 and photodiodes 354 and 355 tap a portion of the input and output powers, respectively, from optical amplifier 332. Likewise, for link 322 photodiodes 360 and 362 tap a portion of the input and output powers, respectively, from optical amplifier 334 and photodiodes 364 and 366 tap a portion of the input and output powers, respectively, from optical amplifier 336. In one embodiment, the tunable lasers that are used may be fast programmable tunable lasers that sweep over the multiple wavelengths to be sampled within a short time (e.g., faster than the EDFA response time). The photodiodes that are used may be simple low-cost diodes since their speed does not have to be higher than the tunable laser sweeping frequency, which in some cases will generally be on the order of milliseconds. Moreover, the use of tunable filters before the photodiodes is optional. Since the tunable sweeping frequency of the laser is known, the photodiode response time can be gated in the time domain in order to determine the ripple response at a particular wavelength, thereby avoiding the need for a filter. It should be noted that the tunable lasers need not necessarily be fast since it is also possible to measure the gain spectrum over a slow timescale. FIG. 7 shows one example of a probe that sweeps over four wavelengths.

In some embodiments the methods described herein for determining the gain spectra of optical amplifiers may be implemented under the control of a network controller such as a software-defining networking (SDN) controller or a network operating system (NOS) controller, which can be used to control the network services and resources (e.g., network switches). The controller may be implemented in a computer program executed by a processor and in some cases it may be implemented as a computer program product. Of course, more generally, the network controller may be implemented in any combination of hardware, software and/or firmware.

When sampling the gain values at the various channels which are selected it is necessary to know the wavelength at which the gain measurements are being made. In general, a time-based or wavelength-based approach may be used. In a wavelength-based approach, an optical channel monitor (OCM) or similar device may be employed to determine the wavelength. Such an OCM is typically provided in the network node and can be used to measure the gain across the various amplifiers on the link connected to the node. Furthermore, the optical switch (e.g., a wavelength selective switch) in each network node may also be used to select the different channels for measurement. Alternatively, an OCM may be located at each optical amplifier to obtain the individual amplifier gains, in which case a tunable filter may be added to each photodetector so that only the power of the appropriate channel is measured.

Figure 8:
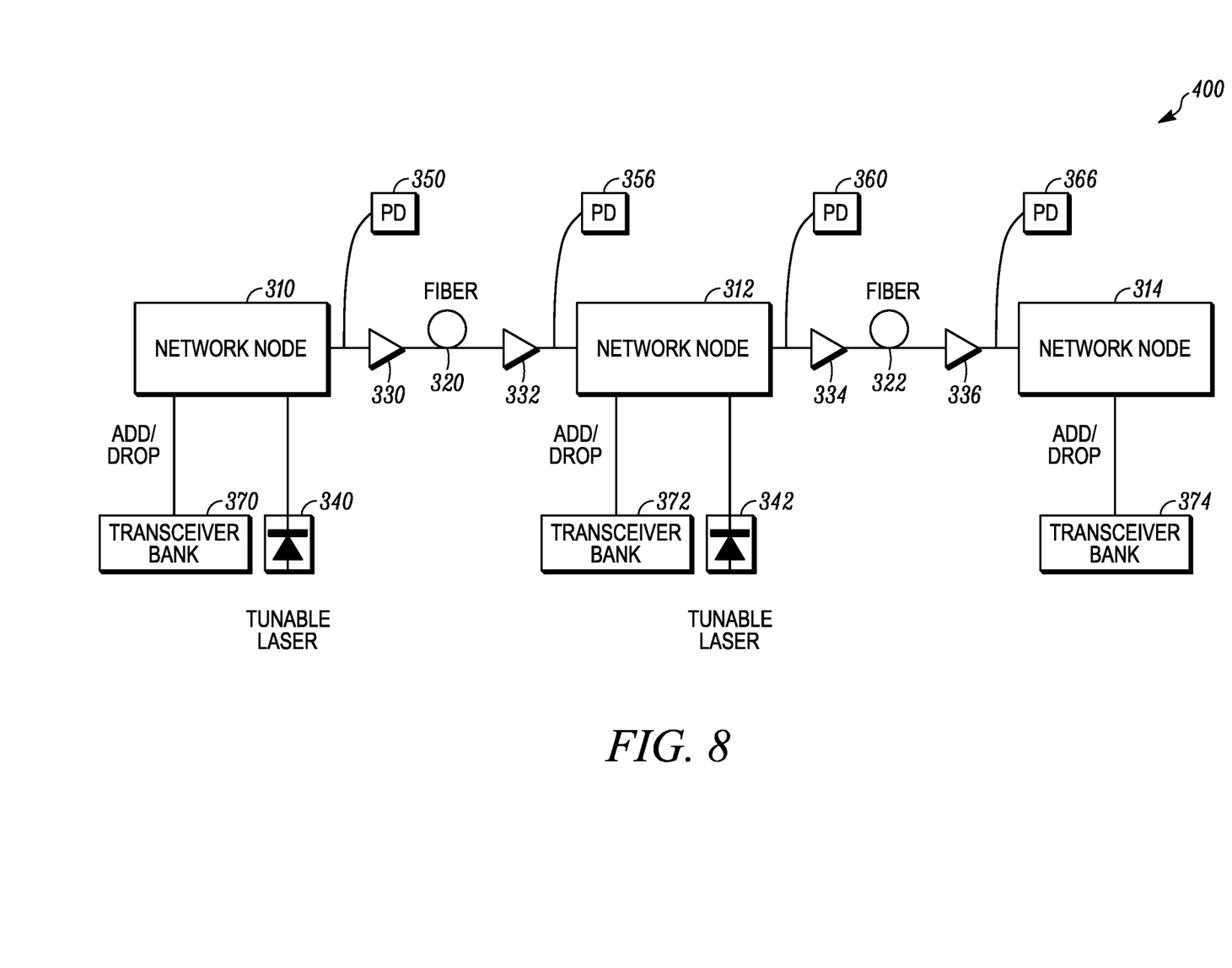
FIG. 8 shows another example of a WDM transmission network that may incorporate the methods, techniques and systems described herein.

In some situations, it is more important to know the power performance at each network node rather than the specific gain spectrum of each individual EDFA. In this case it is only necessary to use a photodiode before the first optical amplifier in the span and after the last optical amplifier in the span in order to determine the ripple that accumulates over each span. An optical communication system 400 that is arranged in this manner is shown in FIG. 8. In FIGS. 6 and 8, like elements are denoted by like reference numerals. Because only the optical power before the first and after the last optical amplifier needs to be measured, in some embodiments the photodiodes may be located at the network nodes themselves, in which case it may even be possible to measure the probe using the receiver photodiodes on the transceiver banks of the nodes if they are available.

In an alternative embodiment, one or more of the gain values obtained at one or more selected channels by the probe for an optical amplifier currently being employed in an operational communication system can be replaced with gain values obtained from existing channels that are currently active in the system. That is, instead of inserting a probe at a particular channel or wavelength, a channel or wavelength that is currently lit and used to carry traffic or which serves as a dummy or idle tone may be used to obtain one or more of the gain values.

While the techniques described herein have been described as being applicable to erbium-doped optical amplifiers, more generally the techniques described herein may be applied to other rare-earth doped optical amplifiers as well, such as ytterbium-doped optical amplifiers for example. Moreover, these techniques may also be applied to other types of optical amplifiers such as Raman amplifiers, for instance. Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for determining the gain spectrum of an erbium doped optical amplifier (EDFA), comprising:
   providing an EDFA that is to accommodate a specified number of channels at different optical wavelengths;
   selecting a subset of the specified number of channels at which gain is to be measured, wherein a number of channels in the subset is determined based at least in part on a number of samples required by the Nyquist sampling theorem to reconstruct the gain spectrum;
   measuring a gain value for each channel in the selected subset of channels for a probe signal that does not perturb the gain spectrum of the EDFA by more than a prescribed amount; and
   constructing the gain spectrum for the EDFA from the measured gain values.

2. The method of claim 1 wherein selecting the subset of channels includes selecting a minimum number of channels required by the Nyquist sampling theorem to reconstruct the gain spectrum.

3. The method of claim 1 wherein the EDFA is incorporated in a WDM transmission network supporting live traffic on one or more of the channels.

4. The method of claim 1 further comprising generating the probe signal using a tunable laser.

5. The method of claim 4 further comprising scanning the tunable laser across wavelengths corresponding to the selected subset of channels.

6. The method of claim 5 wherein the tunable laser is pulsed at each channel.

7. The method of claim 1 wherein constructing the gain spectrum for the EDFA further comprises constructing the gain spectrum using the measured gain values for selected channels and using a WDM fit for remaining ones of the channels.

8. The method of claim 1 further comprising comparing the gain spectrum that is constructed for the EDFA to a measured gain spectrum for the EDFA to identify deviations therebetween at one or more channels that arise from spectral hole burning.

9. The method of claim 1 wherein the probe signal has a power level such that the probe signal does not perturb the gain spectrum by more than 0.2 dB.

10. The method of claim 1 wherein the probe signal has a power level such that the probe signal does not perturb the gain spectrum by more than 0.1 dB.

11. The method of claim 1 wherein the probe signal is a probe pulse having a duration that is less than a response time of the EDFA.

12. The method of claim 1 wherein one or more existing channels operating in a communication system in which the EFDA is incorporated serves as one more of the probe signals used to measure the gain value for one or more respective ones of the selected subset of channels.

13. A method for determining the gain spectrum of an optical amplifier, comprising:
   providing an optical amplifier that is to accommodate a specified number of channels at different optical wavelengths;
   selecting a subset of the specified number of channels at which gain is to be measured, wherein a number of channels in the subset is determined based at least in part on a number of samples required by the Nyquist sampling theorem to reconstruct the gain spectrum;
   measuring a gain value for each channel in the selected subset of channels for a probe signal having a power level such that the probe signal does not perturb the gain spectrum of the optical amplifier; and
   constructing the gain spectrum for the optical amplifier from the measured gain values.

14. The method of claim 13 wherein selecting the subset of channels includes selecting a minimum number of channels required by the Nyquist sampling theorem to reconstruct the gain spectrum.

15. The method of claim 13 wherein the optical amplifier is incorporated in a WDM transmission network supporting live traffic on one or more of the channels.

16. The method of claim 13 further comprising generating the probe signal using a tunable laser.

17. The method of claim 16 further comprising scanning the tunable laser across wavelengths corresponding to the selected subset of channels.

18. The method of claim 16 wherein the tunable laser is pulsed at each channel.

19. The method of claim 13 wherein constructing the gain spectrum for the optical amplifier further comprises constructing the gain spectrum using the measured gain values for selected channels and using a WDM fit for remaining ones of the channels.

20. The method of claim 13 further comprising comparing the gain spectrum that is constructed for the optical amplifier to a measured gain spectrum for the optical amplifier to identify deviations therebetween at one or more channels that arise from spectral hole burning.

21. The method of claim 13 wherein the optical amplifier is a rare-earth doped optical amplifier.

22. The method of claim 13 wherein the optical amplifier is a Raman optical amplifier.

23. The method of claim 13 wherein the probe signal has a power level such that the probe signal does not perturb the gain spectrum by more than 0.2 dB.

24. The method of claim 13 wherein the probe signal has a power level such that the probe signal does not perturb the gain spectrum by more than 0.1 dB.

25. The method of claim 13 wherein the probe signal is a probe pulse having a duration that is less than a response time of the EDFA.

26. The method of claim 13 wherein one or more existing channels operating in a communication system in which the EDFA is incorporated serves as one more of the probe signals used to measure the gain value for one or more respective ones of the selected subset of channels.

27. An optical communication system, comprising:
a plurality of network nodes;
a plurality of optical links each operatively coupling two of the network nodes for establishing optical communication therebetween;
at least one optical amplifier located in at least one of the optical links, the at least one optical amplifier being arranged to accommodate a specified number of channels at different optical wavelengths;
first and second photodetectors arranged to respectively measure input power to and output power from the optical amplifier;
a controller for controlling network services and resources, the controller being configured to determine a gain spectrum of the at least one optical amplifier by (i) causing a subset of the specified number of channels to be selected at which gain is to be determined, wherein a number of channels in the subset is determined based at least in part on a number of samples required by the Nyquist sampling theorem to reconstruct the gain spectrum (ii) determining, from power measurements obtained by the first and second photodetectors, a gain value for each channel in the selected subset of channels for a probe signal that does not perturb the gain spectrum of the optical amplifier by more than a prescribed amount; and (iii) constructing the gain spectrum for the optical amplifier from the measured gain values.

28. The optical communication system of claim 27 wherein the at least one optical amplifier includes a plurality of optical amplifiers located in one of the optical links, the first photodetector including a plurality of first photodetectors each being arranged to measure input power to one of the optical amplifiers, the second photodetector including a plurality of second photodetectors each being arranged to measure output power from one of the optical amplifiers, the controller being configured to construct a gain spectrum for each of the optical amplifiers from input and output powers of the optical amplifiers measured by the photodetectors at a number of channels required by the Nyquist sampling theorem to reconstruct the gain spectrum of each optical amplifier.

29. The optical communication system of claim 27 further comprising a tunable laser for generating a probe signal at each of the selected channels from which the power measurements are obtained by the first and second photodetectors, the probe signal to be transmitted through the optical link such that the probe signal does not perturb the gain spectrum of the optical amplifier by more than a prescribed amount.

30. The optical communication system of claim 27 wherein the optical amplifier is a rare-earth doped optical amplifier.

31. The optical communication system of claim 30 wherein the rare-earth doped optical amplifier is an erbium doped optical amplifier.

32. The optical communication system of claim 27 wherein the at least one optical amplifier includes a plurality of optical amplifiers located in one of the optical links, the first photodetector being located before a first optical amplifier in the optical link and the second photodetector being located after a last of the optical amplifiers in the link, the controller being configured to construct a gain spectrum for the optical link from the input and output powers measured by the first and second photodetectors at a number of channels required by the Nyquist sampling theorem to reconstruct the gain spectrum for the optical link.

* * * * *